Oct. 17, 1933.  J. E. LILIENFELD  1,931,460
SYSTEM OF MEASURING CAPACITY AND POWER FACTOR, AND APPARATUS THEREFOR
Filed Dec. 31, 1930  2 Sheets-Sheet 1
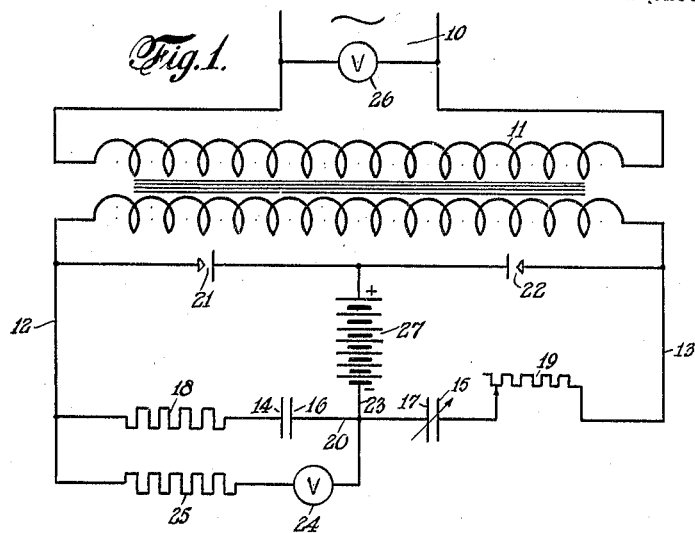
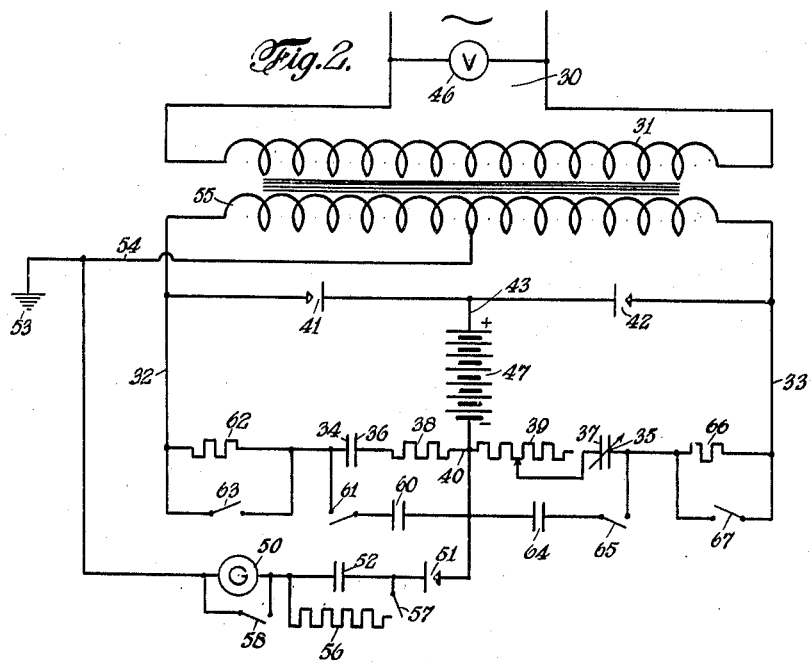
INVENTOR
JULIUS EDGAR LILIENFELD
ATTORNEY Oct. 17, 1933.   J. E. LILIENFELD   1,931,460
SYSTEM OF MEASURING CAPACITY AND POWER FACTOR, AND APPARATUS THEREFOR
Filed Dec. 31, 1930   2 Sheets-Sheet 2

INVENTOR
JULIUS EDGAR LILIENFELD
BY
ATTORNEY

Patented Oct. 17, 1933

1,931,460

UNITED STATES PATENT OFFICE 1,931,460

SYSTEM OF MEASURING CAPACITY AND POWER FACTOR, AND APPARATUS THEREFOR

Julius Edgar Lilienfeld, Winchester, Mass., assignor to Ergon Research Laboratories, Inc., Malden, Mass., a corporation of Delaware Application December 31, 1930
Serial No. 505,710

18 Claims. (Cl. 175—183)

The invention relates to a method of measuring the impedance, capacity and/or power factor of a condenser as adapted for use with alternating current, and also to the novel instrument employed therein.

It has for an object an extremely sensitive precision measuring instrument which may be used with any frequency and wave form of the alternating current utilized in the measuring operation.

A further object of the invention resides in a capacity and power factor measuring instrument based upon the use of a standard DC voltmeter (e. g. galvanometer) and involving neither subjective balancing methods, such as obtaining a minimum balance with head phones, nor specially designed instruments, such as a vibration galvanometer, high sensitivity dynamometer, etc.

The invention has for a still further object the provision of a system of measurement in which capacity and power factor readings may be taken with an alternating current at practically any voltage, and either alone or superimposed over any DC voltage.

In carrying out the invention, a bridge system connection of two condensers is utilized, more particularly of the nature set forth in my copending application for Letters Patent of the United States re: Method of operating alternating current electrolytic condensers and circuit therefor, filed June 19, 1930, Serial No. 462,252; and in which the respective plates of two condensers are connected to opposite sides of an alternating current supply line. The circuit set forth in said application is so designed that at no period will one pair of the respective plates of the condensers—or their electrolyte when electrolytic condensers are utilized—become positive with respect to the other pair of the plates.

In the particular arrangement, furthermore, and assuming equal capacity and power factor, the voltage between the two pairs of respective plates, as measured with the DC voltmeter set forth, will increase whenever the respective capacities and/or power factor of the two condensers begin to differ.

The potential of one pair of condenser plates of this system with respect to the other pair adjusts itself continuously to the relative values of capacity and power factor of the condenser which is being effected, for example, by introducing between the sets of condenser plates by-passing means operative only for charges at a half-cycle of current arriving negatively thereat. That is to say, if both condensers be of equal capacity, the voltages, as read upon a DC voltmeter, between the two respective sets of plates are equal and at a minimum corresponding to half the peak of the applied alternating current voltage. On the other hand, should one of the condensers have a negligible capacity relatively to the other one, then the said voltages between the two respective sets of plates will remain equal but will increase substantially to the full peak AC applied voltage.

The foregoing principle is utilized in the novel system to determine an unknown capacity and wherein this capacity is balanced against a standard known variable and calibrated capacity (and resistance) until a minimum voltage reading is obtained across the said unknown capacity, this voltage being approximately one-half the peak of the alternating applied voltage.

The nature of the invention, however, will best be understood when described in connection with the accompanying drawings, in which:

Fig. 1 is a diagrammatic view illustrating the various electrical connections involved and arrangement of apparatus of the novel system.

Figs. 2 and 3 are similar views illustrating modifications in the layout and suitable for more refined measurements.

Figure 3:
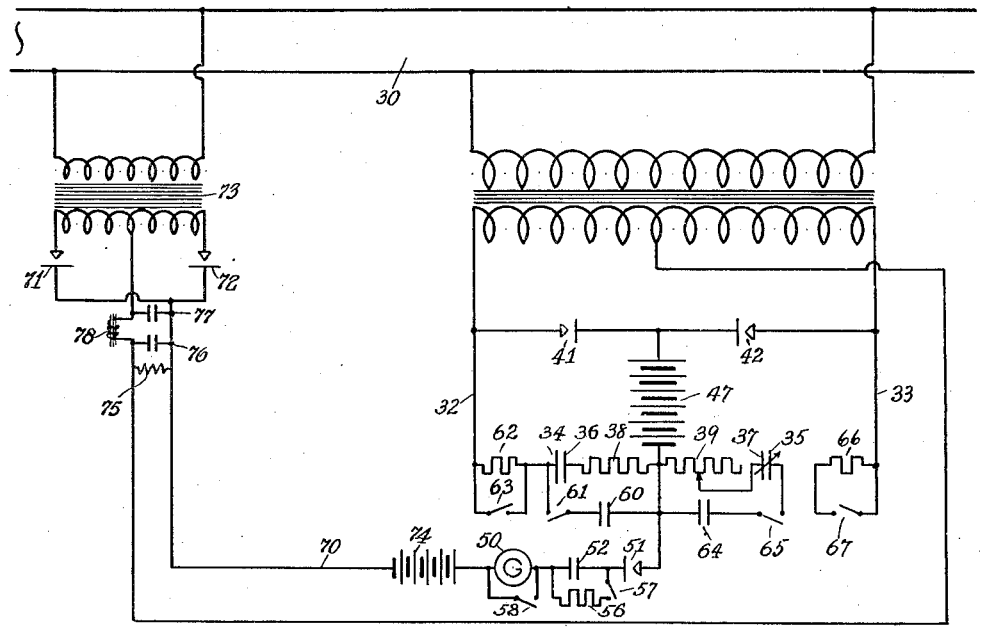

Referring to Fig. 1 of the drawings, and which illustrates the invention in its simplest embodiment, 10 designates the mains of a source of alternating current supply, the terminals of which are connected to the primary 11 of a transformer; and the leads 12 and 13 of the secondary of said transformer have connected across the same a pair of plates 14 and 15 of condensers having corresponding plates 16 and 17.

The condenser embodying the plates 14 and 16 is the one of unknown capacity, and the condenser having the plates 15 and 17 is of a variable calibrated standard design suitable for adjustment as hereinafter set forth. The inherent resistance of the condenser 14—16 may be represented as at 18 and is a fixed quantity, while the resistance of the condenser 15—17 is represented as a portion of a variable rheostat 19 which is adjustable in making the capacity and power factor measurements, as hereinafter set forth.

Furthermore, the plates 16 and 17 associated with the plates 14 and 15 are represented as electrically connected by means of a conductor 110

20 to place the condensers in series with each other but in opposed relationship.

There is further connected across the leads 12 and 13 and in advance of the condensers a pair of uni-directional members 21 and 22, the arrangement of the same being such that they oppose each other and that with respect to their polarities the respective negative terminals of each are connected to the corresponding plates 14 and 15. These uni-directional members, or rectifiers, may be of the thermionic type, or may be mercury rectifiers, synchronously operated switches, vibrators and the like; but it is important that they be of a negligibly low impedance.

There is, furthermore, provided an electrical connection 23 from between the said uni-directional members to the conductor 20, whereby a uni-directional member will serve to by-pass the corresponding one plate of a condenser to the other for current arriving negatively thereat, as is more fully set forth in my aforesaid copending application. A high resistance voltmeter 24, whose total resistance is represented at 25, is connected across the condenser 14—16 which represents the one whose capacity is to be determined. However, an electrostatic voltmeter may be utilized instead.

With low impedance of the aforesaid uni-directional members, it will readily be understood that one set of plates can at no time have a negative potential, with respect to the other set, under the action of the alternating current applied thereto, since a uni-directional element will practically short-circuit the plates of one set to the other set during each half-cycle that arrives negatively thereat. On the other hand, there will be, broadly speaking, no other definition to the potential of the other set except that it cannot possibly be positive at any time with respect to one permanently maintained positive. This condition being fulfilled, the potential will adjust itself according to the capacity and the leak of the plates and will therefore at all times assume values corresponding to the utmost possible stability of the physical system consisting of the two sets of plates.

If the condenser 14—16 then be considered the unkown quantity, it is necessary for measuring its value merely to adjust the known variable capacity 15—17 until a minimum reading is obtained on the voltmeter 24; and, in view of the fact that the condenser possesses a certain resistance, to make further adjustment as of the variable resistance 19 until a minimum voltage indication is again obtained. It will be found that a small change of either the variable capacity 15—17 or the resistance 19 will then effect an appreciable deflection of the voltmeter pointer.

Under these conditions, the voltage drop across the unknown capacity and resistance is equal to one-half the peak voltage of the alternating current supply, which voltage may be indicated on a further AC voltmeter 26 connected across the mains 10; and the capacity reading is obtained directly from the condenser 15—17 in the usual manner.

While this is true without the use of a biasing voltage, it is also possible to bias permanently one set of plates against the other one; and to this end a suitable source of DC electromotive force may be included in series in the conductor 23. For example, a storage battery or dry battery 27 may be included in series in this conductor in order to overcome the voltage drop in the uni-directional members 21, 22, or to steady electrolytic condensers at different conditions.

Fig 2 illustrates the addition to the hereinbefore described circuit of means for making the measurements by a ballistically operated instrument in place of the voltmeter 24, and whereby a virtually unrestricted increase of the sensitivity of the method is made possible. Alternating current is similarly supplied from the mains 30 to the primary 31 of a transformer, whose secondary outgoing leads 32 and 33 are similarly connected to the corresponding plates 34 and 35 of condensers having also the associated plates 36 and 37, respectively. The capacity of the condenser 35—37 is variable as in the previously described embodiment and the inherent resistances of the two condensers are represented respectively by the resistances 38 and 39, and of which the latter is variable. The two plates 36 and 37 are connected by means of the conductor 40; and rectifying members 41 and 42 are connected across the leads 32 and 33 and through a conductor 43 to the said plates. A voltmeter 46 is connected across the mains 30; and a biasing battery 47 is also provided in series in the conductor 43.

The voltmeter 24 of the previously described embodiment together with its inherent resistance 25, however, is replaced by a ballistically operated galvanometer 50 connected to the conductor 40 through a rectifier member 51 and through a condenser 52 of relatively large capacitance, the other side of the galvanometer being grounded as at 53 and connected by a conductor 54 also to some point, preferably the mid- or symmetrical point of the secondary 55 of the transformer. The additional rectifier member 51 should be well insulated from the ground, and its filament if the rectifier is of the vacuum tube type is to be heated by the current from a suitable dry cell or storage battery (not shown).

The advantage in the use of the ballistically operated galvanometer resides in the feature that the sensitivity of measurement is not limited by the sensitivity of the galvanometer, and may be increased indefinitely by increasing the value of the capacitance of condenser 52. It admits, also, of reducing disturbance due to fluctuations of the AC supply very considerably.

Provision is made, moreover, to leak off the charge of condenser 52 as by providing in shunt therewith a resistance 56 which may be introduced through the closing of a switch 57. A further switch 58 is preferably provided to allow of short-circuiting the galvanometer while the charge is being leaked off through said resistance 56 and in order to avoid uncontrollable large deflections of the galvanometer, as well as to save time in operation. This short-circuiting switch remains closed for the same reason while the leak 56 is being open-circuited by opening switch 57, and the galvanometer is allowed to settle for a short period to ascertain what zero shifting, if any, occurs. When this has attained a steady point, a capacity of resistance charge is effected in either leg of the condenser and thus causing the ballistic deflections which embody the measurement proper.

For example, assuming that the measuring circuit is balanced, the capacitance of condenser 34—36 will equal the capacitance of condenser 35—37, and resistance 38 will equal resistance 39. If then, one of the branches is unbalanced by the introduction of a capacity 60, as through the closing of a switch 61, or by the introduction of a resistance 62, through the opening of a switch 63, a deflection will be had on the galvanometer 50. Similarly, a capacity 64 may be introduced in the other branch through the closing of a switch 65 or a resistance 66 through the opening of a switch 67, and the deflection produced thereby similarly noted, which deflection should be in case of balance equal to the deflection due to the introduction in the other branch of the capacity or resistance of equal value. The deflections in case of balance will satisfy also a minimum condition, inasmuch as in the unbalanced case the larger of the two deflections will be smaller than either of the two equal deflections at balance. It will be understood that prior to making these measurements, the galvanometer is short-circuited and the switch 57 has been closed to reduce the capacitance of condenser 52 just slightly below the observed level.

Referring to Fig. 3 of the drawings, further provision is made to eliminate uncertainty due to voltage fluctuation in the AC supply of mains 30. This may be effected by merely adding to the galvanometer grounding lead 70 from galvanometer 50 a compensating voltage produced across a resistance 75, eventually over capacities 76, 77 and choke 78, through full-wave rectification by rectifiers 71, 72 of an AC supply taken from the mains 30 through a transformer 73. Any desirable percentage of the compensating voltage thus obtained may be backed up with the voltage of a battery or the like 74.

Figure 4:
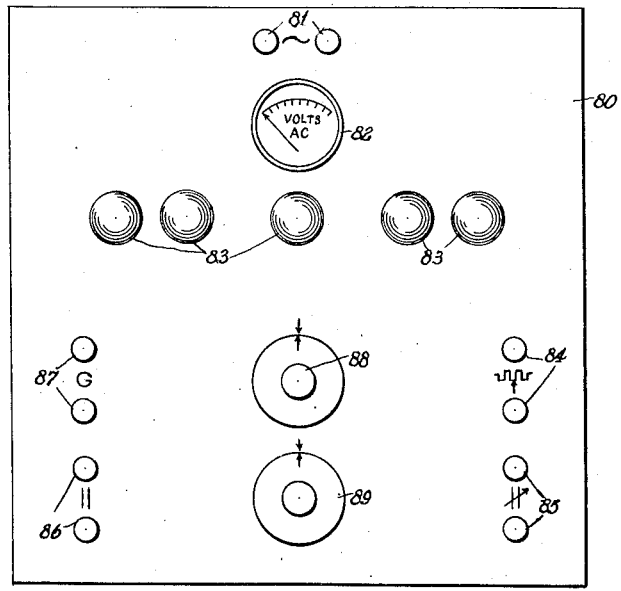
Fig. 4 is a plan view of a panel or instrument case adapted for housing various apparatus utilized in the system and for affording convenient connection thereto.

For convenience of operation and to assemble as much of the apparatus as possible within a suitable housing or mounting the same on a panel, provision is made for a top or panel 80, Fig. 4 of the drawings. At the upper portion, for example, binding posts 81 or other suitable connection means are located and to which the AC mains are adapted to be attached. A voltmeter 82 is shown mounted below these binding posts to indicate the voltage of the aforesaid AC supply. The required rectifiers are shown at 83. Pairs of terminal posts, or other suitable means of connection to the unit, are located along opposite sides of the panel, as the binding posts 84 and 85 at the one side and adapted respectively for the variable resistance and the variable capacitance which are utilized in making the measurement of the unknown capacitance. The latter is arranged for connection to the panel through binding posts 86 disposed at the opposite side, for example, and above which is provided a further set of binding posts 87 for connection of a ballistic galvanometer which is of the sensitive reflector type.

There is further provided on the panel a resistance switch device 88 and capacitance switch device 89, said switches each embodying also the galvanometer short-circuiting switch 58 and the leak-off switch 57 of the system previously described, and shown in Figs. 2 and 3. The said switches 88 and 89 are of any well known or special design, for example, they may be of the usual drum controller type; and are adapted to cut in and out the required units in predetermined sequence. Thus, in the case of the capacitance units, the switch device 89 first effects short-circuiting of the galvanometer, then throws in the leak-off resistance and again open-circuits it, then places the galvanometer again in operation, then throws the one small unit of capacitance into one leg of the measuring, and finally the other small unit of capacitance into the other leg, whereupon the cycle may be repeated.

Similarly, the resistance switch device 88 first effects the short-circuiting of the galvanometer, then the introduction and open-circuiting of the leak-off resistance and the reintroduction of the galvanometer, whereupon the two increments of resistance are successively cut into the respective legs.

It will be understood that while the capacity increments are of equal value, as well as the resistance increments, different values of the pairs of units may be substituted where a different order of magnitude of the capacitance measurement is involved.

For rapid approximate measurements, the arrangement set forth in Fig. 1 of the drawings is of course the more practical and an approximation may first be made of the unknown capacitance by such device and then followed, for more exact determination, by utilizing the arrangement set forth in Figs. 2 or 3.

It will be appreciated, also, that the hereinbefore described circuits are suitable for the measurement of inductances as by introducing the same in series with capacitances of known values.

I claim:

1. The method of measuring the electrical characteristics of a condenser, which comprises setting up a level of direct current voltage as a function of the relative values of both capacities and resistances of two different capacitances, the one being of known values and the other unknown, and balancing the known values against the unknown ones to a predetermined reading of direct voltage level.

2. The method of measuring the electrical characteristics of a condenser, which comprises setting up by the application of an alternating current voltage a level of direct current voltage as a function of the relative values of both capacities and resistances of two different capacitances, the one being of known values and the other unknown, and balancing the known values against the unknown ones to one-half the peak voltage of the applied alternating current.

3. The method of measuring the electrical characteristics of a condenser by balancing the same against a variable condenser of known capacitance, which comprises connecting both condensers in series opposed relationship across a source of alternating current supply, by-passing to one set of condenser plates the current arriving negatively at the other set and simultaneously blocking the outflow of a negative charge from the first-named set of plates of the condensers to the other set, and adjusting the variable condenser until the voltage drop across the condenser of unknown capacitance equals approximately one-half the peak voltage of the alternating current supply and at which value the capacitances of the two condensers are substantially equal.

4. The method of measuring the electrical characteristics of a condenser by balancing the same against a variable condenser of known capacitance and resistance, which comprises connecting both condensers in series opposed relationship across a source of alternating current supply, by-passing to one set of condenser plates the current arriving negatively at the other set and simultaneously blocking the outflow of a negative charge from the first-named set of plates of the condensers to the other set, adjusting the variable condenser until the voltage drop across the condenser of unknown capacitance equals approximately one-half the peak voltage of the alternating current supply and at which value the capacitances of the two condensers are substantially equal, and balancing the resistance of the condenser of unknown values against a known variable resistance also connected across the source of alternating current supply and until the voltage drop across the condenser of unknown capacitance equals approximately one-half the peak voltage.

5. The method of measuring the electrical characteristics of a condenser by balancing the same against a variable condenser of known capacitance, which comprises connecting both condensers in series opposed relationship across a source of alternating current supply, by-passing to one set of condenser plates the current arriving negatively at the other set and and simultaneously blocking the outflow of a negative charge from the first-named set of plates of the condensers to the other set, adjusting the variable condenser until the voltage drop across the condenser of unknown capacitance equals approximately one-half the peak voltage of the alternating current supply and at which value the capacitances of the two condensers are substantially equal, then introducing alternately in circuit with the condenser of unknown capacitance and the condenser of known capacitance an additional and small capacitance, and checking the increase of voltage of the one against the other until the same are substantially equal.

6. The method of measuring the electrical characteristics of a condenser by balancing the same against a variable condenser of known capacitance and resistance, which comprises connecting both condensers in series opposed relationship across a source of alternating current supply, by-passing to one set of condenser plates the current arriving negatively at the other set and simultaneously blocking the outflow of a negative charge from the first-named set of plates of the condensers to the other set, adjusting the variable condenser until the voltage drop across the condenser of unknown capacitance equals approximately one-half the peak voltage of the alternating current supply and at which value the capacitances of the two condensers are substantialy equal, balancing the resistance of the condenser of unknown values against a known variable resistance also connected across the source of alternating current supply and until the voltage drop across the condenser of unknown capacitance equals approximately one-half the peak voltage, then introducing alternately in circuit with the condenser of unknown capacitance and condenser of known capacitance a small resistance, and checking the increase of voltage of the one against the other until the same are substantially equal.

7. The method of measuring the electrical characteristics of a condenser by balancing the same against a variable condenser of known capacitance and resistance, which comprises connecting both condensers in series opposed relationship across a source of alternating current supply, by-passing to one set of condenser plates the current arriving negatively at the other set and simultaneously blocking the outflow of a negative charge from the first-named set of plates of the condensers to the other set, adjusting the variable condenser until the voltage drop across the condenser of unknown capacitance equals approximately one-half the peak voltage of the alternating current supply and at which value the capacitances of the two condensers are substantially equal, balancing the resistance of the condenser of unknown values against a known variable resistance also connected across the source of alternating current supply and until the voltage drop across the condenser of unknown capacitance equals approximately one-half the peak voltage, then introducing alternately in circuit with the condenser of unknown capacitance and condenser of known capacitance a small resistance, and utilizing ballistic deflections to measure increase of voltage of the one against the other until the same are substantially equal.

8. The method of measuring the electrical characteristics of a condenser by balancing the same against a variable condenser of known capacitance, which comprises connecting both condensers in series opposed relationship across a source of alternating current supply, by-passing to one set of condenser plates the current arriving negatively at the other set and simultaneously blocking the outflow of a negative charge from the first-named set of plates of the condensers to the other set, adjusting the variable condenser until the voltage drop across the condenser of unknown capacitance equals approximately one-half the peak voltage of the alternating current supply and at which value the capacitances of the two condensers are substantially equal, and neutralizing the effect of the voltage fluctuations in the source of alternating current supply by introducing a compensating voltage derived by rectification of the alternating current obtained from said source of supply thereof.

9. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, means to short-circuit one set of plates to the other one only for current arriving negatively thereat, and a voltage measuring member in circuit with one of the condensers.

10. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, a pair of uni-directional members adapted to short-circuit one set of plates to the other one for current arriving negatively thereat, and a voltage measuring member connected across one of the condensers.

11. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, a pair of uni-directional members connected across the source of alternating current supply in manner to oppose each other and with their negative terminals connected to one set of plates of the condensers, means electrically connecting the other set of plates of said condensers, an electrical connection from between said uni-directional elements to the said connection between the last-named set of plates, and a voltmeter bridged across the said connection between the plates of a set and other plate of one of the condensers.

12. Measuring apparatus for determining the electrical characteristics of a condenser, comprising a source of alternating current supply, a condenser of unknown capacitance, a calibrated variable condenser, the said condensers having one set of plates connected together and the other set of plates connected across the source of alternating current supply, a calibrated variable resistance in series with the calibrated variable condenser, means to short-circuit one set of plates to the other set only for current arriving negatively thereat, and a voltage measuring member connected across one of the condensers.

13. Measuring apparatus for determining the electrical characteristics of a condenser, comprising a source of alternating current supply, a condenser of unknown capacitance, a calibrated variable condenser, the said condensers having one set of plates connected together and the other set of plates connected across the source of alternating current supply, a calibrated variable resistance in series with the calibrated variable condenser, a pair of uni-directional members connected across the source of alternating current supply in manner to oppose each other and with their negative terminals connected to the corresponding set of plates, means electrically connecting the other set of plates of said condensers, an electrical connection from between said uni-directional elements to the said connection between the last-named set of plates, and a voltmeter bridged across the said connection between the plates of a set and the other plate of one of the condensers.

14. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, means to short-circuit one set of plates to the other one only for current arriving negatively thereat, a grounded galvanometer connected to the connection between the one set of plates, and a condenser of relatively large capacitance and a rectifier included in circuit with the galvanometer between said condenser of unknown capacitance and the galvanometer.

15. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, means to short-circuit one set of plates to the other one only for current arriving negatively thereat, a voltage measuring member in circuit with one of the condensers, means to introduce in parallel with said condenser of unknown capacitance an additional small capacitance, and means to introduce in parallel with the condenser of variable capacitance an additional small capacitance.

16. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, means to short-circuit one set of plates to the other one only for current arriving negatively thereat, a voltage measuring member in circuit with one of the condensers, means to introduce in series with the condenser of unknown capacitance an additional small resistance, and means to introduce in series with the condenser of variable capacitance an additional small resistance.

17. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, means to short-circuit one set of plates to the other one only for current arriving negatively thereat, a grounded galvanometer connected to the connection between the one set of plates, a condenser of relatively large capacitance and a rectifier included in circuit with the galvanometer between said condenser of unknown capacitance and the galvanometer, and means to connect a resistance in shunt with said condenser of relatively large capacitance.

18. Measuring apparatus for determining the electrical characteristics of a condenser, comprising a source of alternating current supply, a condenser of unknown capacitance, a calibrated variable condenser, the said condensers having one set of plates connected together and the other set connected across the source of alternating current supply, means to short-circuit one set of plates to the other one only for current arriving negatively thereat, a grounded galvanometer connected to the connection between the one set of plates, a condenser of relatively large capacitance and a rectifier included in circuit with the galvanometer between said condenser of unknown capacitance and the galvanometer, and means included in circuit with the galvanometer to compensate for fluctuations in voltage in the supply of alternating current.

JULIUS EDGAR LILIENFELD.